United States Patent [19]

Takai et al.

[11] Patent Number: 5,561,673
[45] Date of Patent: Oct. 1, 1996

[54] ANTENNA SWITCHED DIVERSITY RECIEVER

[75] Inventors: Hitoshi Takai, Osaka; Hidetoshi Yamasaki, Amagasaki; Yoshio Urabe, Ibaraki, all of Japan

[73] Assignee: Matsushita Electric Industrial Co., Ltd., Osaka, Japan

[21] Appl. No.: 227,446

[22] Filed: Apr. 14, 1994

[30] Foreign Application Priority Data

Apr. 16, 1993 [JP] Japan .................................. 5-089615
Apr. 16, 1993 [JP] Japan .................................. 5-089616

[51] Int. Cl.⁶ .............................. H04B 7/08; H04L 1/06; H04L 1/20
[52] U.S. Cl. ........................................ 371/5.5; 455/277.2
[58] Field of Search ............................ 371/5.5; 455/13.3, 455/277.1, 277.2, 134, 135; 375/100, 347

[56] References Cited

U.S. PATENT DOCUMENTS

| | | | |
|---|---|---|---|
| 4,953,197 | 8/1990 | Kaewell, Jr. et al. | 379/58 |
| 4,977,616 | 12/1990 | Linder et al. | 455/277 |
| 5,036,515 | 7/1991 | Freeburg | 371/5.5 |
| 5,095,535 | 3/1992 | Freeburg | 455/278 |
| 5,117,236 | 5/1992 | Chang et al. | 342/367 |
| 5,138,327 | 8/1992 | Chang et al. | 342/367 |
| 5,203,024 | 4/1993 | Yamao | 455/133 |
| 5,203,026 | 4/1993 | Ekelund | 455/134 |
| 5,235,621 | 8/1993 | Amir-Alikhani | 375/100 |
| 5,239,541 | 8/1993 | Murai | 370/77 |
| 5,280,637 | 1/1994 | Larosa et al. | 455/134 |
| 5,303,240 | 4/1994 | Borras et al. | 370/95.3 |
| 5,321,850 | 6/1994 | Bäckström et al. | 455/139 |
| 5,323,421 | 6/1994 | LaRosa et al. | 375/10 |
| 5,329,555 | 7/1994 | Marko et al. | 375/100 |
| 5,345,600 | 9/1994 | Davidson | 455/50.1 |
| 5,361,395 | 11/1994 | Yamamoto | 455/33.2 |
| 5,392,300 | 2/1995 | Borth et al. | 371/37.7 |

FOREIGN PATENT DOCUMENTS

| | | |
|---|---|---|
| 00095165 | 5/1983 | European Pat. Off. . |
| 0400983 | 5/1990 | European Pat. Off. . |
| 56-68037 | 8/1981 | Japan . |
| 58-38037 | 5/1983 | Japan . |
| 59-24569 | 11/1984 | Japan . |
| 62-59425 | 3/1987 | Japan . |
| 63-194440 | 8/1988 | Japan . |
| 2-213234 | 8/1990 | Japan . |
| 4008031 | 1/1992 | Japan . |
| 4047729 | 2/1992 | Japan . |
| 5-29993 | 2/1993 | Japan . |

OTHER PUBLICATIONS

Proceedings 39th IEEE Vehicular Technology Conference, 1–3 May 1989, San Francisco, vol. II, pp. 470 473, Y. Akaiwa, "Antenna Selection Diversity for Framed Digital Signal Transmission in Mobile Radio Channel".

"Performance of Feedback and Switch Space Diversity 900 MHz Mobile Radio Systems with Raleigh Fading", A. J. Rustako, Jr. et al., IEEE Transactions on Communications, vol. Com–21, No. 11, Nov. 1973.

"Comparison of Selection and Switched Diversity Systems for Error–Rate Reduction at Base–Station Sites in Digital Mobile Radio Systems", J. D. Parsons et al., pp. 393—398, IEEE VTC. '87, 1987.

Digital Communications, Bernard Sklar, pp. 288–298, 1988, by Prentice Hall.

*Primary Examiner*—Stephen M. Baker
*Attorney, Agent, or Firm*—Price, Gess & Ubell

[57] ABSTRACT

An antenna switched diversity receiver comprising a plurality of physically separated antennas, a switching unit for selectively switching to one of the plurality of antennas to receive a burst in a time series, a decoding unit for decoding transmission data contained in the received burst in a reversed manner to coding, a bit-error-detecting unit for detecting a bit error in decoded data in each received burst, and a control unit for controlling the switching unit in accordance with the bit-error detection result. The receiver may additionally include a RSSI (received signal strength indicator) checking unit for checking a RSSI of a switched antenna and a RSSI holding unit for holding a RSSI. The receiver constructed as above controls switching based on detection of at least one bit error in each of m consecutive bursts burst alone or together with the RSSI. As a result, the receiver obtains excellent diversity effect while being compact and economical.

22 Claims, 14 Drawing Sheets

1

ANTENNA SWITCHED DIVERSITY RECIEVER

BACKGROUND OF THE INVENTION (1) Field of the Invention

The present invention relates to a digital radio system in which data are transmitted in bursts by Time Division Multiple Access (TDMA), Time Division Duplex (TDD) or packets, and more particularly, to an antenna switched diversity receiver.

(2) Related Arts

In a radio system, a transmission channel over radiowave propagation paths is subject to various environmental disturbances. Radiowave signals traveling through propagation paths are subject to "fading" such that a radiowave becomes weaker or transmission characteristics vary at a receiving point. For example, "multipath-fading" occurs when incoming waves, each having their respective phases and amplitudes, interfere with each other at a receiving point due to reflections or diffractions from obstacles along the transmission paths.

The multipath-fading is critical in a mobile radio system because it causes considerable fluctuation in received signal strength (electric field strength of a radio wave) each time a mobile station moves. Similarly, in a digital radio system, the multipath-fading causes an output decrease or waveform distortion, resulting in a high bit-error-rate (BER). BER represents a ratio of erroneously received bits to total bits in a received signal.

Given these problems, "diversity technique" has been proposed in a variety of embodiments. Basically, two or more branches having a small cross-correlation, i.e., a small probability of simultaneous fading, are used to reduce the fading effects by selecting or combining the output signals from the branches.

The diversity technique divides into several schemes, which include "space diversity", depending on the branches used. [For further information, see "Mobile Communications Engineering", William C. Y. Lee, McGraw-Hill Book Company] The digital radio system, which uses a single carrier, employs the space diversity: two or more transmission paths are constructed by setting physically separated antennas (usually spaced out about a carrier's wave length or more) in a matching number, making a cross-correlation small.

Further, the space diversity sub-divides into "combining diversity" and "selective-combining diversity". Two or more received signals are combined in the combining diversity, while a received signal having the best quality is selected by means of switching in the switching diversity. Compared with the combining diversity, the selective-combining diversity enables a more compact and economical receiver. This is because the combining diversity essentially includes a phase control circuit while the selective-combining diversity does not. However, on the other hand, abrupt changes in phases and amplitudes after every selection or switching and waveform distortion occur with the selective-combining diversity.

The selective-combining diversity further sub-divides into "antenna selection diversity" and "antenna switched diversity"; an example of the former is disclosed in Japanese Laid-open Patent Application No. 58-38037 and that of the latter in Japanese Laid-open Patent Application No. 56-68037. In the antenna selection diversity, each antenna is connected to their respective receiving units, and one antenna having the greatest received-signal-strength indicator (RSSI) is selected. Whereas in the antenna switched diversity, all antennas are connected to a single receiving unit, and they are switched one from another when the RSSI of a currently selected antenna falls below a predetermined threshold level.

More detailed explanation of the antenna selection diversity and antenna switched diversity will be given.

FIG. 1 is a block diagram depicting a structure of a conventional antenna selection diversity receiver. The receiver includes two physically separated antennas 11, 12. Signals received by the antennas 11, 12 are respectively inputted into receiving units 13, 14, to be decoded. The decoded signals are inputted into RSSI checking units 16, 17, respectively, so that either one having a greater RSSI is selected by a switching unit 15 under the control of a control circuit 18. The decoded signal thus selected is further outputted to an external device via a data output terminal 19.

When the cross-correlation between the antennas 11, 12 is small, even if one of the two signals fades out, still the other remains unfaded. Therefore, the receiver constructed as above always selects a signal having a greater RSSI, improving the quality of the decoded signal significantly. However, on the other hand, its inherent structure, i.e., including two or more branches and RSSI checking units, makes it difficult to realize a downsized or economical receiver.

FIG. 2 is a block diagram depicting a structure of a conventional antenna switched diversity receiver. The receiver includes two physically separated antennas 21, 22. Unlike the antenna selection diversity, one of the signals from the antennas 21, 22 is selected by a switching unit 23 first, and then, the selected signal is inputted into a receiving unit 24 to be decoded, and further outputted to an external unit via a data output terminal 27. The receiving unit 24 also outputs the selected signal to a RSSI checking unit 25, which compares the RSSI of the selected signal with a predetermined threshold: when the RSSI falls below the threshold, the switching unit 23 switches to the other currently non-selected antenna under the control of a control circuit 26.

Like in the antenna selection diversity, when the cross-correlation between the antennas 21, 22 is small, even if one of the two signals fades out, the other still remains unfaded in most of the cases. Thus, the quality of the decoded signal is significantly improved. Moreover, the structure including a set of one receiving unit and one RSSI checking unit realizes a more compact and economical receiver compared with the antenna selection diversity.

However, the antenna switched diversity is inferior to the antenna selection diversity in diversity effect. The diversity effect around the threshold is substantially the same since both the schemes determine an antenna based on the RSSI. However, when the mean RSSI is far in excess of the threshold, although an antenna with a greater RSSI will always be selected with the antenna selection diversity receiver, no switching will be carried out with the antenna switched diversity, effecting no diversity at all. There also may be a case when the mean RSSI is far below the threshold. On simultaneous fade-out, each antenna's RSSI stays lower than the threshold, causing an excessive switching, so-called "hunting", that generates unfavorable switching noise. Moreover, the diversity effect is considerably reduced if the receiving unit's transient response is slow.

In addition, an antenna switched diversity is easily affected by external noises or interferences, which include co-channel or adjacent channel interferences in a multi-cell system. Those noises or interferences increase the measured RSSI. Therefore, the setting of threshold level to switch becomes inappropriate and causes performance deterioration for antenna switched diversity, while, for antenna selection diversity, the performance is not affected because the measured RSSIs in both antennas are relatively compared each other.

For further understanding, the antenna switched diversity characteristics will be explained more in detail.

A variety of embodiments, such as switch-and-examine (SE) and switch-and-stay (SS), have been proposed depending on conditions for switch-activation or algorithms.

In the SE, the switching is repeated until the RSSI of one of the antennas exceeds a threshold. This may cause the hunting, and thus is not preferable, particularly in analog transmission. Whereas in the SS, even if a newly switched antenna's RSSI is below the threshold, the switching will be restarted after its RSSI exceeds the threshold. [For further information, see "Performance of Feedback and Switch Space Diversity 900 MHz FM Mobile Radio Systems with Rayleigh Fading" A. J. Rustako, Jr, Y. S. Yeh, R. R. Murray, pages 1257–1268, IEEE Transactions on Communications, Vol. Com-21, No. 11, November 1973]

Next, the analysis of the received signal's cumulative probability distribution (CPD) after switching and diversity gain will be given. The CPD represents a probability P that a carrier-to-noise ratio (CNR) $\gamma$ is equal or less than x, ($\gamma \leq x$). Assume that an antenna switched diversity receiver used herein includes two antennas and employs either the SS or SE using one threshold; the antennas have a small cross-correlation and both are subject to Rayleigh fading with a mean CNR $\Gamma$. Rayleigh fading is typically observed in land mobile transmission, which causes an abrupt RSSI fluctuation.

Since no-diversity CPD $q_x$ is expressed as:

$$q_x = 1 - e^{-x/\Gamma} \tag{1}$$

P ($\gamma \leq x$) can be expressed as:

$$P(\gamma \leq x) = q_x - q_{\gamma_T} + q_x \cdot q_{\gamma_T}, \text{ when } x > \gamma_T = q_x \cdot q_{\gamma_T}, \text{ when } x \leq \gamma_T \tag{2}$$

wherein $\gamma_T$ is a threshold CNR for switching.

A graph in FIG. 3 shows the result where $\gamma_T$ is −6.5, −4.0, −2.8 dB from the mean CNR $\Gamma$. In FIG. 3, the CPD characteristics of the no-diversity and selection diversity are also shown in dotted and dashed lines respectively for comparison.

To evaluate the diversity gain, a marginal quality in outage rate must be defined. The outage referred to herein is a state where the quality of a received signal degrades; i.e., bit errors occur because of a received signal drop due to fading. Let the marginal outage rate be 10% for the use of explanation herein.

The comparison between the dotted and dashed lines of cumulative probability reveals that the diversity gain in the selection diversity is large where a mean RSSI is sufficiently high (for example, at the center of a radio coverage), and small where the mean RSSI is low (for example, at the boundary of the coverage). In contrast, the diversity gain in the antenna switched diversity is large around a threshold level, and decreases rapidly above the threshold level. Note that the diversity gain of both diversities are equal at the threshold level.

More precisely, given the outage rate of 10%, the selection diversity obtains 5.5 dB as the diversity gain. Thus, to obtain the same diversity gain while keeping degradation within 1.5 dB (=diversity gain of 4 dB) in the antenna switched diversity, $\gamma_T$ must be set at a range of −6.5 dB to −2.8 dB from an optimum threshold level of −4 dB. This means that the threshold level must be set precisely within a range of −2.5 dB to +1.2 dB from the optimum level.

Next, more practically for a digital system, a mean BER is analyzed; the signal is modulated by non-coherent FSK (Frequency Shift Keying) herein. [For further information, see "Comparison of Selection and Switched Diversity Systems for Error-rate Reduction at Base-station Sites in Digital Mobile Radio Systems", J. D. Parsons, M. T. Feeney, pages 393–398, IEEE VTC'87, 1987.

A relation between a CNR $\gamma$ and a BER $P_e(\gamma)$ in a non-fading environment is expressed as:

$$P_e(\gamma) = (\tfrac{1}{2})e^{-\gamma/2} \tag{3}$$

Then, a mean BER, $P_{e,k}$, is expressed as:

$$P_{e,k} = \int_o^\infty P_e \cdot (\gamma) \cdot P_2 \cdot (\gamma) \cdot d\gamma \tag{4}$$

where $P_2(\gamma)$ is a probability density function of a CNR of a received signal.

Hence, a mean BER $P_{e,1}$ in no-diversity is expressed as:

$$P_{e,1} = 1/(2+\gamma_o) \tag{5}$$

where $\gamma_o$ is a mean CNR.

Therefore, a mean BER, $P_{e,2}$, is expressed as:

$$P_{e,2} = P_{e,1} \{1 - e^{\gamma_T/\gamma_o}(1-e^{-\gamma_T/2})\} \tag{6}$$

Expression (6) is differentiated to find a minimal condition for $P_{e,2}$, then we get $$\gamma_T = 2 \ln(1+\gamma_o/2) \tag{7}$$

Thus, an optimum threshold CNR is determined by Expression (7).

However, since $\gamma_o$ is the mean CNR, in practice, it is difficult to accurately determine the optimum threshold CNR with Equation (7). Because it takes quite a long time to estimate the mean value for a slow moving speed, and the CNR must take into account external noise and inteference signals, which are difficult to be measured readily. When these external noise and interferences are not negligible, a total noise power is not easily estimated; therefore, it is almost impossible to estimate the CNR, although the RSSI can be measured.

A relationship between a threshold CNR and the mean BER is shown by a graph in FIG. 4. The dotted and dashed lines represent cases of the no-diversity and selection diversity, respectively. The graph shows that the optimum thresholds $\gamma_T$ for the mean CNRs 13 dB and 20 dB are 7 dB and 9 dB, respectively.

The comparison at troughs with the dashed and dotted lines reveals that the diversity gain in the antenna switched diversity at the mean CNR of 13 dB is reduced approximately by two-thirds compared with the selection diversity. Also the comparison reveals that the threshold CNR must be maintained precisely within a range of ±1.5 dB to prevent further reduction. Besides, the optimum threshold varies with the mean CNR out of this range (±1.5 dB), and it is by no means easy to estimate the CNR when the external noise and interference signals are not negligible. This leads to a conclusion that setting a predetermined threshold is ineffective to upgrade the diversity effect in the case of the antenna switched diversity.

Thus, it can be concluded that the antenna selection diversity is advantageous over the antenna switched diversity in the diversity effect. Given these circumstances, a technique that realizes a compact, economical antenna switched diversity receiver with the diversity effect as excellent as the antenna selection diversity has been sought after.

SUMMARY OF THE INVENTION

Accordingly, the present invention has an object to provide a compact and economical antenna switched diversity receiver that realizes the diversity effect as excellent as the antenna selection diversity receiver regardless of the interference or noise signals.

The above object is fulfilled by an antenna switched diversity receiver comprising physically separated antennas, a switching unit for selecting one of the signals received by the antennas, a decoding unit for decoding the selected signal, a bit-error detecting unit for detecting a bit error in a certain number of consecutive bursts, a control circuit for controlling the switching unit in accordance with the output from the bit-error detecting unit. The receiver may additionally include a RSSI checking unit for checking a RSSI of a switched antenna and a RSSI holding unit for holding a RSSI.

According to the above construction, the control circuit controls the switching unit to switch to another antenna when the bit-error detecting unit detects bit errors in consecutive bursts in a predetermined number. In this way, the antennas are switched based on bit-error data alone or together with RSSI data, realizing the diversity effect independently of the interference and noise signals. Further, by including a single receiving unit, a compact and economical antenna switched diversity receiver can be realized.

BRIEF DESCRIPTION OF THE DRAWINGS

These and other objects, advantages and features of the invention will become apparent from the following description thereof taken in conjunction with the accompanying drawings which illustrate specific embodiments of the invention. In the drawings.

DESCRIPTION OF THE PREFERRED EMBODIMENTS

In the following four embodiments, the following basic fading characteristics are primary concerns. Fading is caused by interference with a plurality of incoming waves traveling through multiple propagation paths, causing an instantaneous fluctuation in a RSSI. In Rayleigh fading, a fading pitch is proportional to a moving speed of a station, and inversely proportional to a wave length. The fading within a time interval of about $\frac{1}{20}f_D$ ($f_D$: the maximum Doppler frequency) have a correlation. On the other hand, those received by two antennas spaced out about a wave length have substantially no cross-correlation.

Note that in the following embodiments, the fading is assumed to vary at a slow speed (e.g., for a speed of walking, the $f_D$ is a few Hz in 2 GHz band) relative to a burst cycle (e.g. several hundreds Hz). This is a condition that applies to portable devices carried at a speed of walking, or a slow-speed mobile units using 2 GHz or lower band.

Also, it should be noted that the switching does not depend on the CNR as the conventional receivers because switching in the following embodiments can depend on the BER as well. Thus, by substituting Expression (7) in Expression (3), we get $$P_e(\gamma_T) = 1/(2 + \gamma_o)(= P_{e,1}(\gamma_o)) \tag{8}$$

Expression (8) reveals that the optimum threshold in CNR is at a CNR level where a bit error starts to occur. The switching based on the BER is preferable when the external noise and interference signals are not negligible because it can take account of them.

However, switching depending on the BER is not practical because it either takes quite a long time to precisely estimate the BER or slows down the data transmission speed. More precisely, to compute the BER, redundant reference data sequences must be added to the transmission data, and if the time for estimation is shortened by increasing the number of sequences, the data transmission speed decreases; on the other hand, if the data transmission speed is increased by reducing the number of sequences, the estimated BER turns out to be inaccurate, or the estimation requires a long time as compared with the change in the channel due to fading.

To realize a switching that depends on neither the CNR nor BER, the inventors of the present invention devised a method based on sequential bit errors. Bit errors occur mainly when a signal is affected by impulse noise or fading. The former case is referred to as a random error, and it occurs discretely, while the latter case is referred to as a burst errors, and burst errors occur consecutively. Thus, "fade-out", where the received signal is faded out, can be sufficiently detected by detecting bit errors in consecutive instead of estimating a precise BER, and when switching is done at the fade-out based on detection of bit errors in consecutive bursts, an erroneous switching due to impulse noise can be avoided.

FIRST EMBODIMENT

Figure 1:
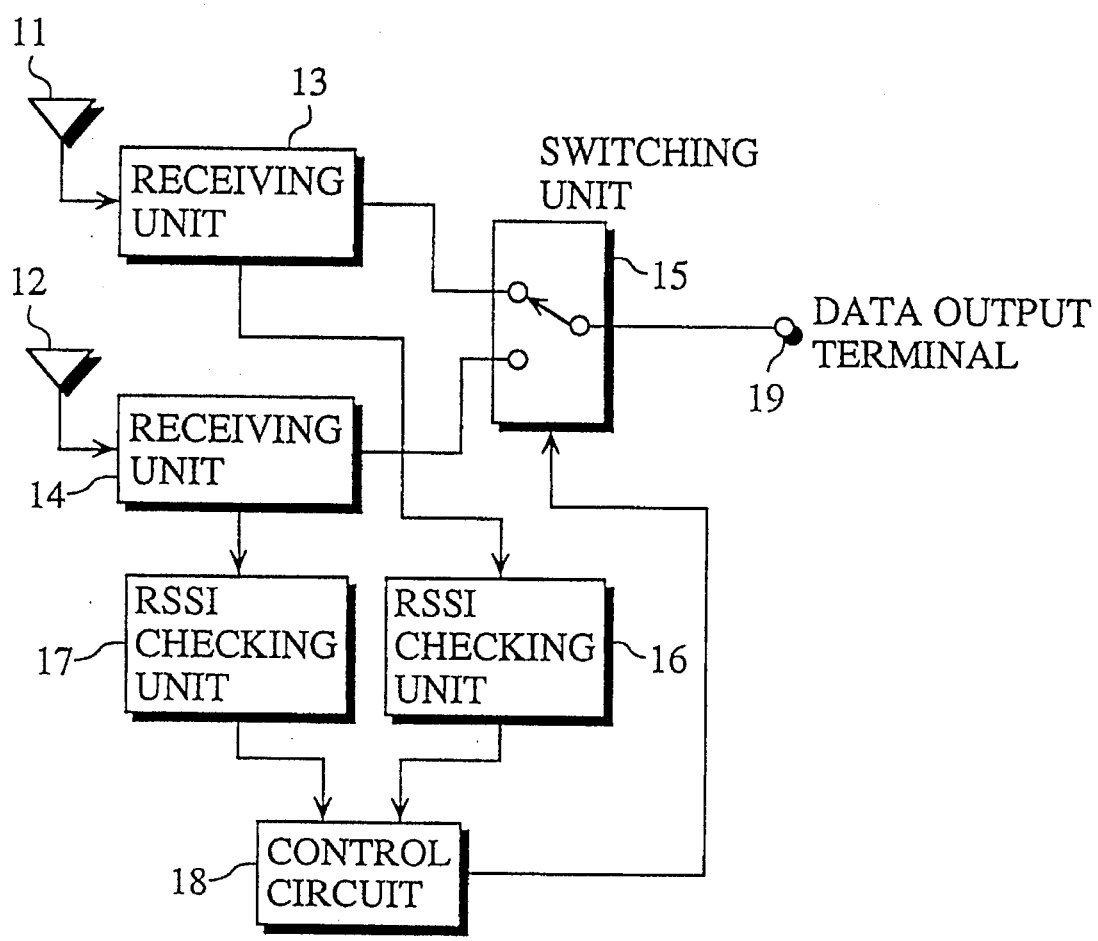
FIG. 1 is a block diagram depicting a conventional antenna selection diversity receiver.
Figure 2:
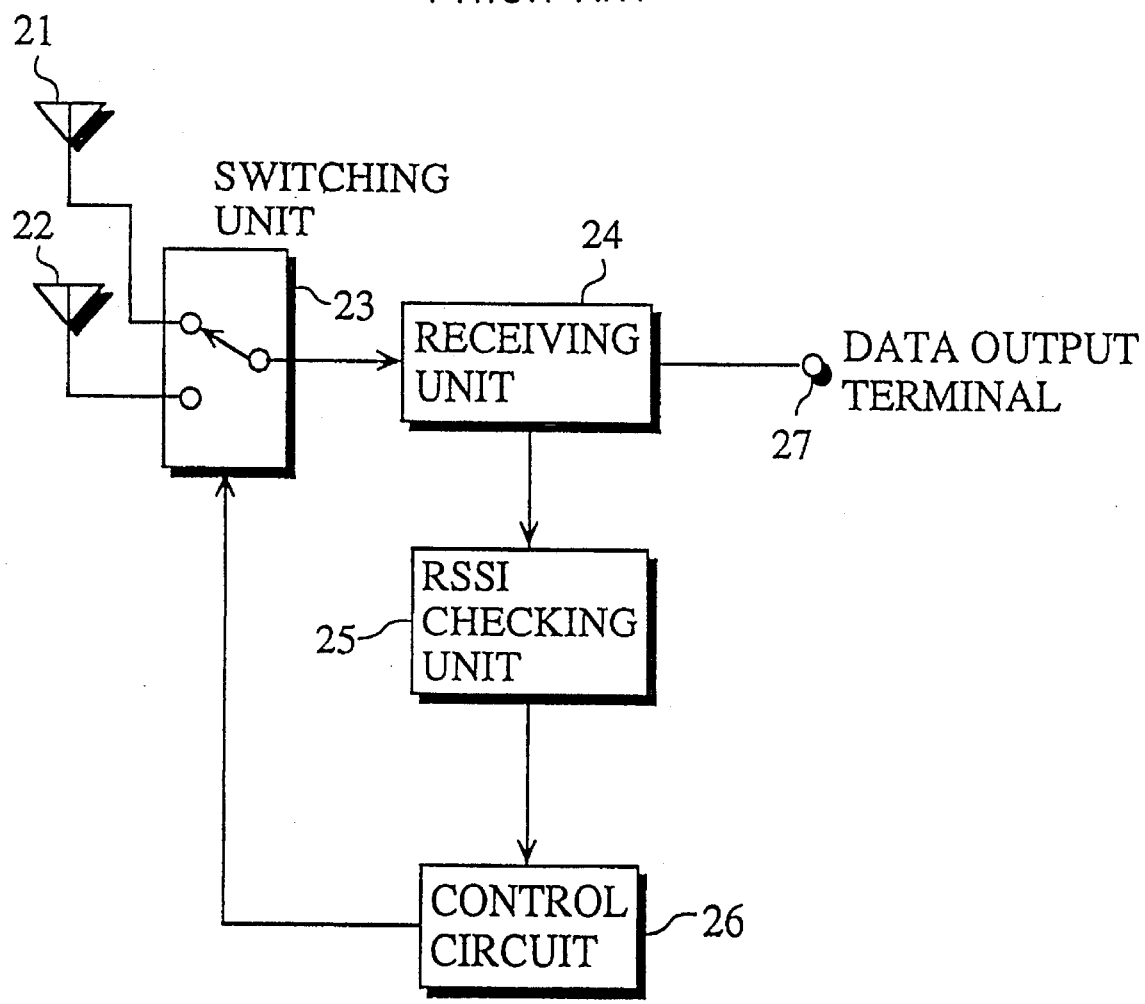
FIG. 2 is a block diagram depicting a conventional diversity receiver using antenna switched diversity receiver.
Figure 3:
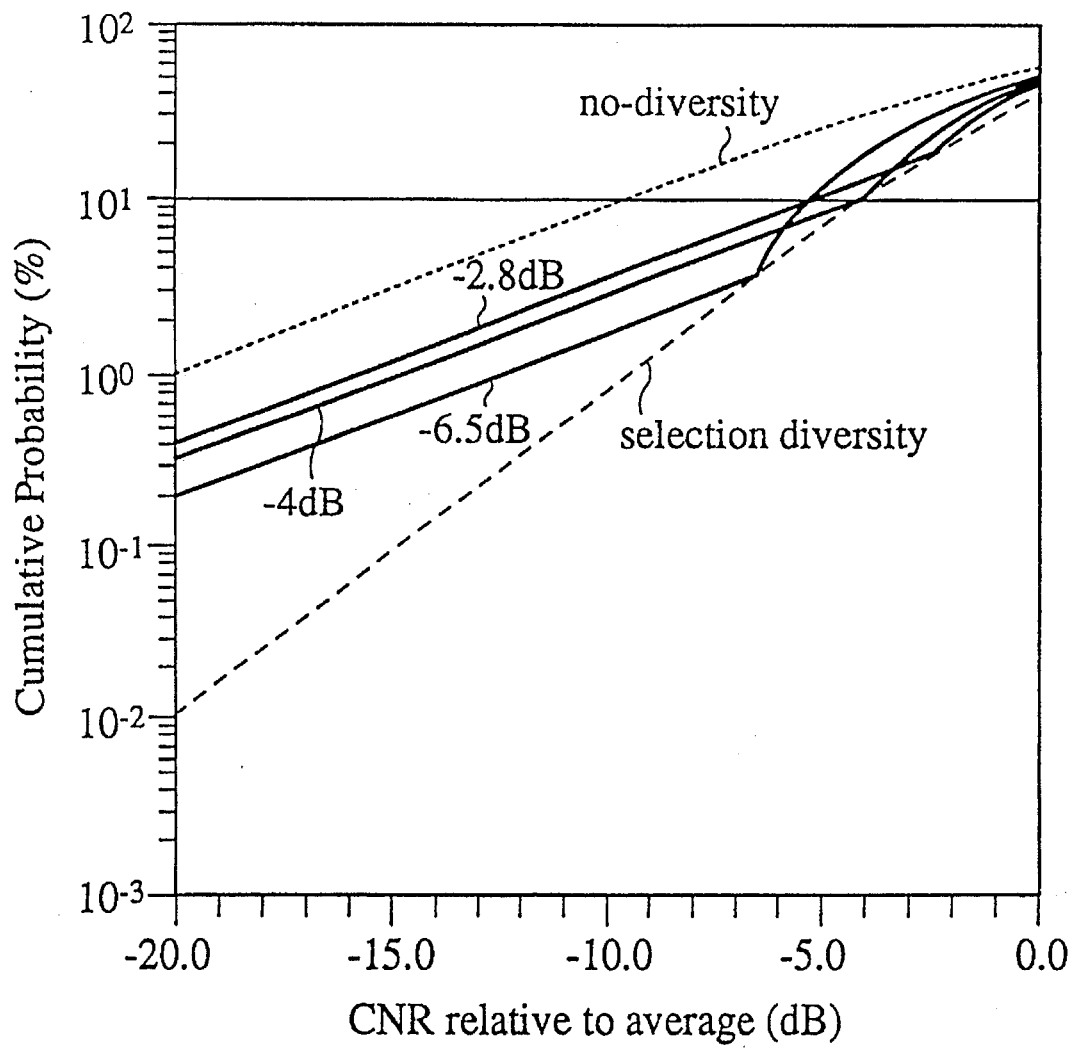
FIG. 3 is a graph showing a relation between a CNR and a CPD.
Figure 4:
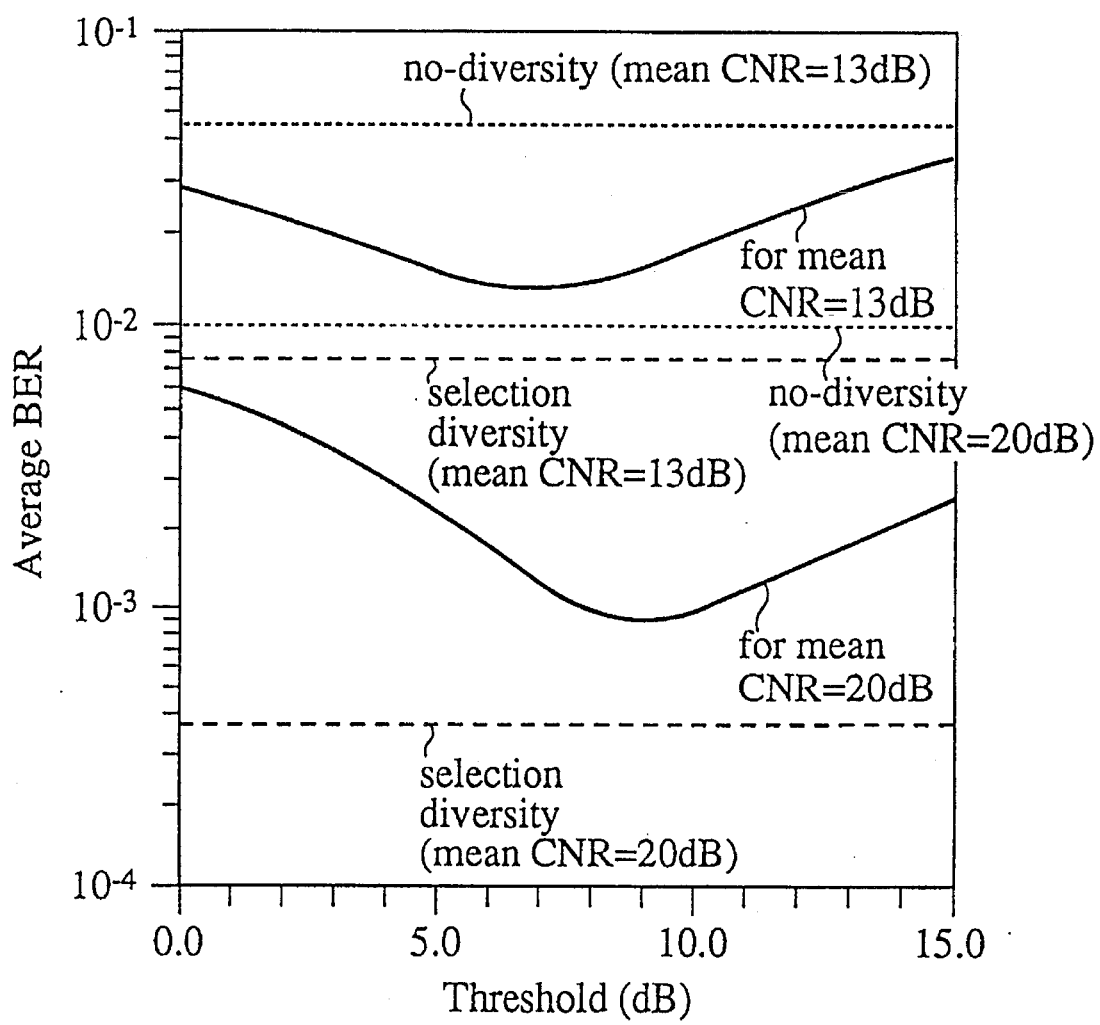
FIG. 4 is a graph showing a relation between a BER and a threshold.
Figure 5:
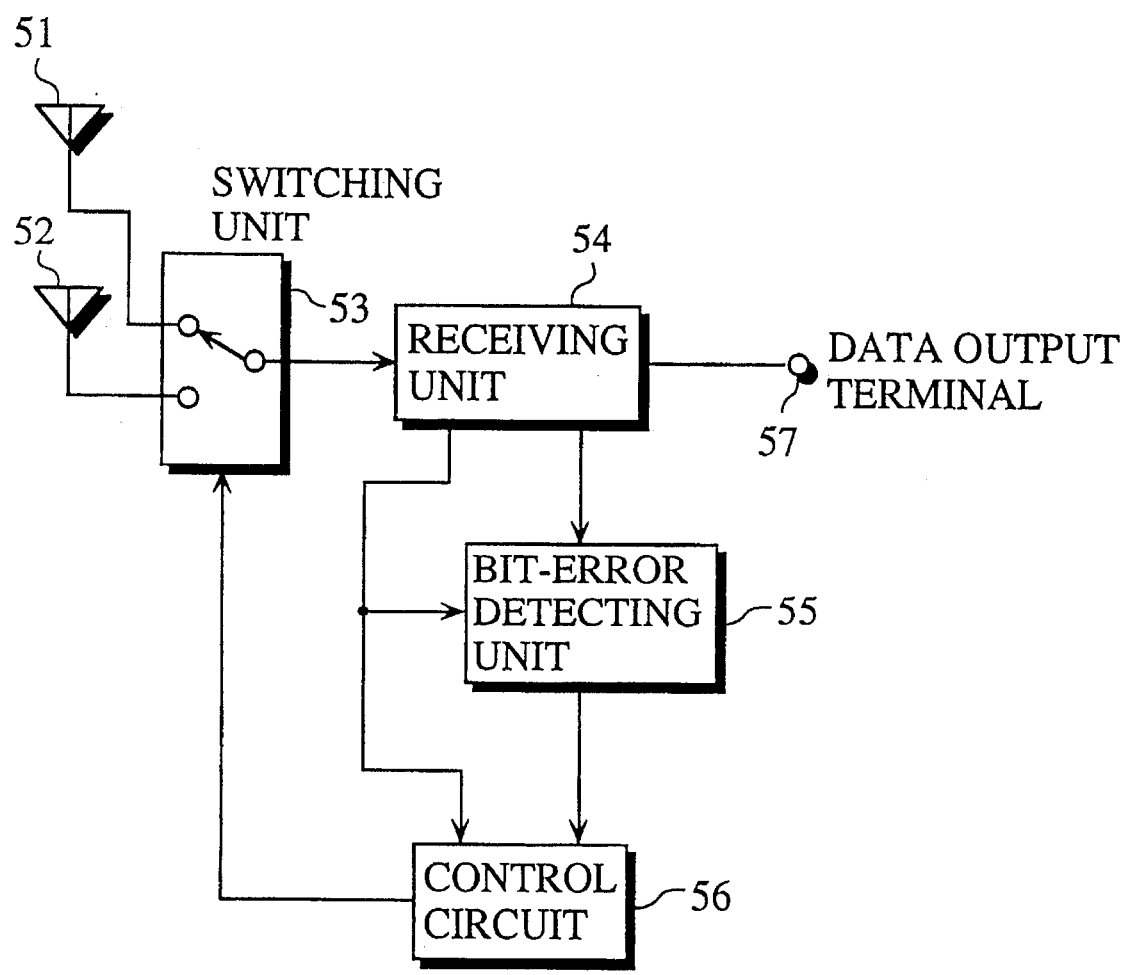
FIG. 5 is a block diagram depicting an antenna switched diversity receiver in accordance with the first embodiment of the present invention.

FIG. 5 is a block diagram depicting an antenna switched diversity receiver in accordance with the first embodiment of the present invention. The receiver includes two physically separated antennas 51, 52, which are spaced out about a wave length or more in general. One of the signals received by these two antennas is selected by a switching unit 53, and is further sent to a receiving unit 54 to be decoded. The decoded signal is outputted from a data output terminal 57 as decoded data. Also, the decoded signal is sent to a bit-error detecting unit 55 which checks the existence of a bit error burst by burst and sends the detection result to a control circuit 56. The control circuit 56 controls the switching unit 53 based on the detection result.

Note that the control circuit 56 activates the switching unit 53 only when the bit-error detecting unit 55 detects at least one bit error in each of a certain number (two or three) of consecutive bursts. The bit-error detecting unit 55 uses, for example, a cyclic redundancy check (CRC) code. In CRC, the transmission data are treated as a high-order polynomial and are divided by a predetermined generating polynomial to attach the remainder at the end of the transmission data as a check bit. The decoded transmission data are divided by the generating polynomial and when the remainder is 0, there is no bit error otherwise, there is a bit error. [See "Digital Communications" Bernard Sklar, pages 288 to 298 for further information]

Figure 6:
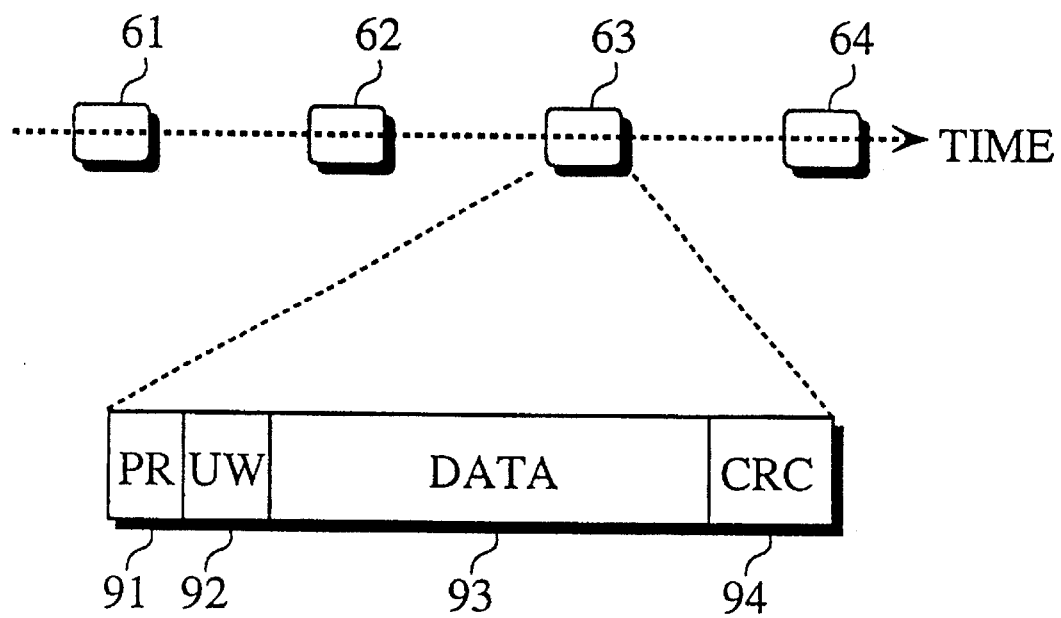
FIG. 6 is an example of data construction sent to the antenna switched diversity receiver in bursts.

FIG. 6 shows a structure of transmission data in bursts which are sent to the receiver in a predetermined time period in the digital radio system. Numerals 61–64 are separate bursts including respective signals, and each burst comprises a preamble 91, a unique word 92, data 93, and a bit-error-detection code 94.

The preamble 91, which is in fact a bit-synchronization signal, reproduces a symbol timing used as a reference when decoding the received signal.

The unique word 92, which is in fact a word-synchronization signal, marks the beginning of the data 93.

The bit-error-detection code 94 uses a CRC code herein. However, other forward error correction codes are also applicable when they have sufficient performance of bit-error detection. In addition, reference data may be attached to each burst and compared after decoding with original reference data held in the receiver; the reference data may be attached at the end of each burst instead of the bit-error-detection code 94, or may be included in the data 93 or in each burst distributively. The unique word 92 may be also used as the reference data: a bit error is detected when the unique word detector 548 fails to detect the unique word 92.

Figure 7:
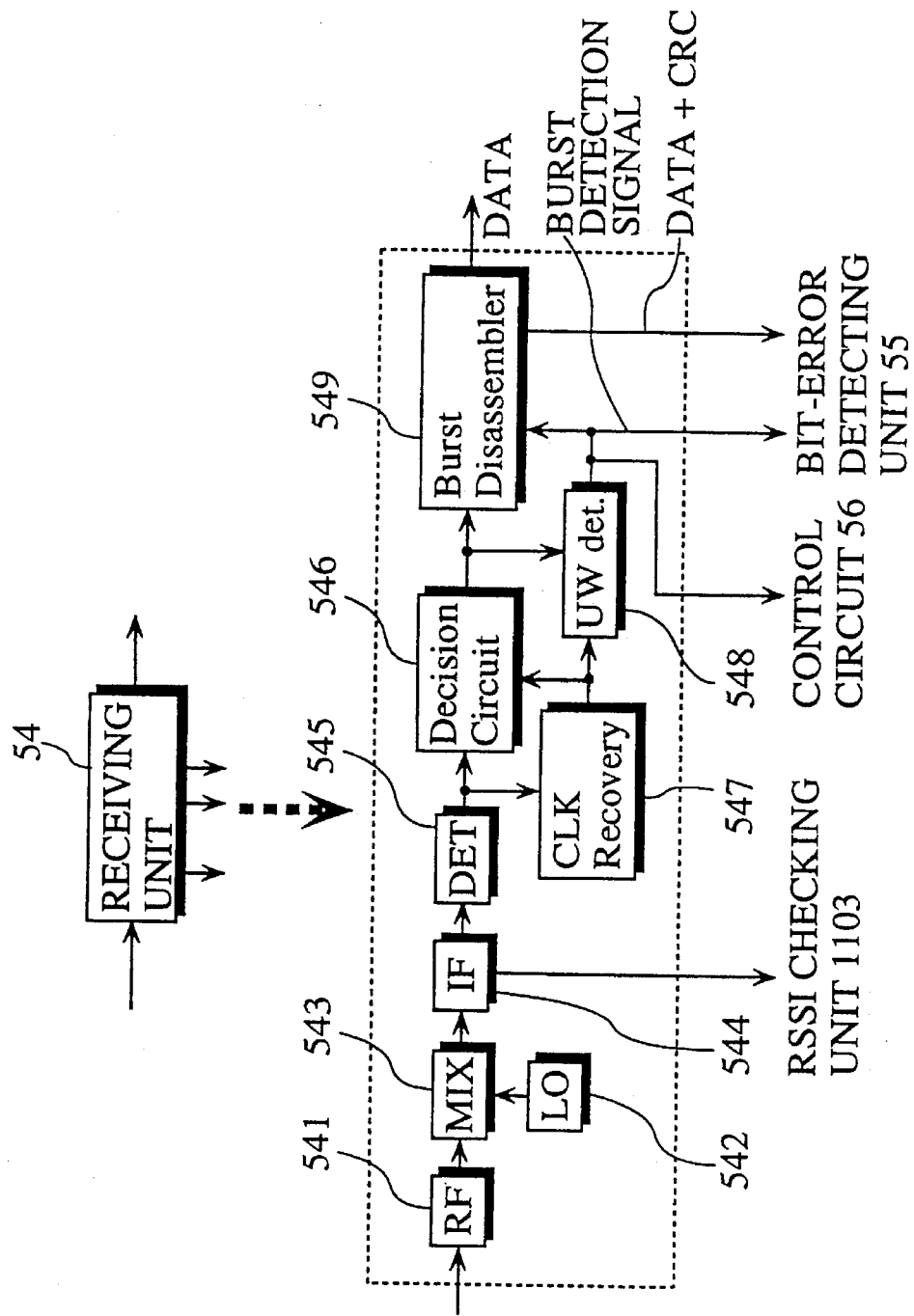
FIG. 7 is a block diagram depicting a receiving unit in FIG. 5.

FIG. 7 is a block diagram depicting a structure of the receiving unit 54. The receiving unit 54 comprises a radio frequency amplifier 541, a local oscillator 542, a mixer 543, an intermediate frequency amplifier 544, a detector 545, a decision circuit 546, a clock recovery circuit 547, a unique word detector 548, and a burst disassembler 549.

The radio frequency amplifier 541 amplifies a received signal. The local oscillator 542 and mixer 543 convert the amplified received signal into an intermediate frequency signal. The detector 545 is, in effect, a digital demodulating circuit. The clock recovery circuit 547 reproduces a symbol clock from the output of the detector 545. The decision circuit 546 recognizes and decides the output from the detector 545 at a timing of the symbol clock from the clock recovery circuit 547 to obtain decoded data. The unique word detector 548 detects the unique word 92 in the output from the decision circuit 546 at a timing of the symbol clock from the clock recovery circuit 547 to output a burst detection signal to the burst disassembler 549, bit-error detecting unit 55, and control circuit 56. The burst disassembler 549 discriminates the data 93 and bit-error-detection code 94 in the output from the decision circuit 546 using the unique word 92. The data 93 is sent to the data output terminal 57, and both the data 93 and bit-error-detection code 94 are sent to the bit-error detecting unit 55.

The above constructed receiver operates as follows. One of the bursts received by the antennas 51, 52 is selected by the switching unit 53, and further inputted into the receiving unit 54. When the detector 545 detects the selected burst, the receiving unit 54 establishes synchronization for the symbol clock using the preamble 91, and detects the beginning of the data 93 using the unique word 92, selecting the data 93 and bit-error-detection code 94 for further processing. The data 93 thus selected from each burst are combined to be decoded back into transmission data and further outputted from the data output terminal 57. Also, upon the detection of the burst, the receiving unit 54 sends the burst detection signal to both the control circuit 56 and bit-error detecting unit 55, while sending both the data 93 and bit-error-detection code 94 in the selected burst to the bit-error detecting unit 55 for a bit-error detection. The detection result is sent to the control circuit 56, which accordingly controls the switching unit 53 on the detection result.

Figure 8:
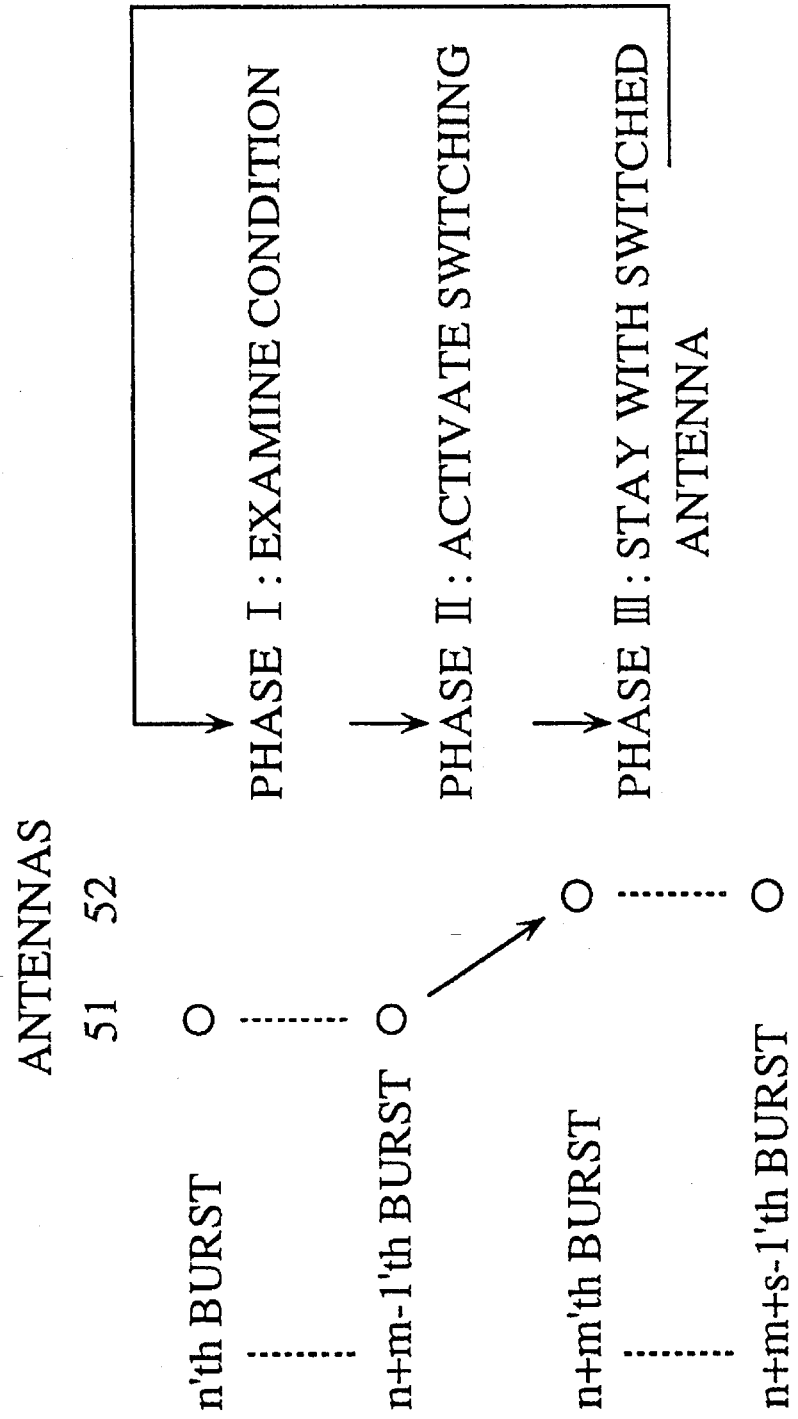
FIG. 8 is a view explaining an antenna-switching operation of the antenna switched diversity receiver in FIG. 5.

The switching control operation by the control circuit 56 is composed of three phases as shown in FIG. 8.

Phase I: the condition for the switching activation is examined.

Phase II: the switching is carried out.

Phase III: the state after switching is maintained for a predetermined number of bursts, or s (s>1) bursts, until the control circuit 56 shifts back to Phase I.

Thus, the control circuit 56 controls the switching unit 53 to switch back and forth between the antenna 51 and 52 as it circulates the three phases. To be more specific, when the activation condition is fulfilled, the control circuit 56 controls the switching unit 53 to select the antenna which is not currently selected.

The condition for activation referred herein is that the bit-error detecting unit 55 sequentially detects bit errors in m (m>1) consecutive bursts. Under this condition, the switching unit 53 will not be activated by a random bit error caused by impulse noise, or in other words, the switching unit 53 is activated at an exact timing when fade-out occurs. This is because fading varies much slower than the burst period, and the bit errors in consecutive bursts occur in a fade-out period.

By including Phase III, a transient response time for the receiver 54, such as synchronization for clock reproduction, is allowed to avoid an excess switching or hunting during the transient response time. When the receiver 54 exhibits a superior transient response, Phase III can be omitted by setting s to 1.

Figure 9:
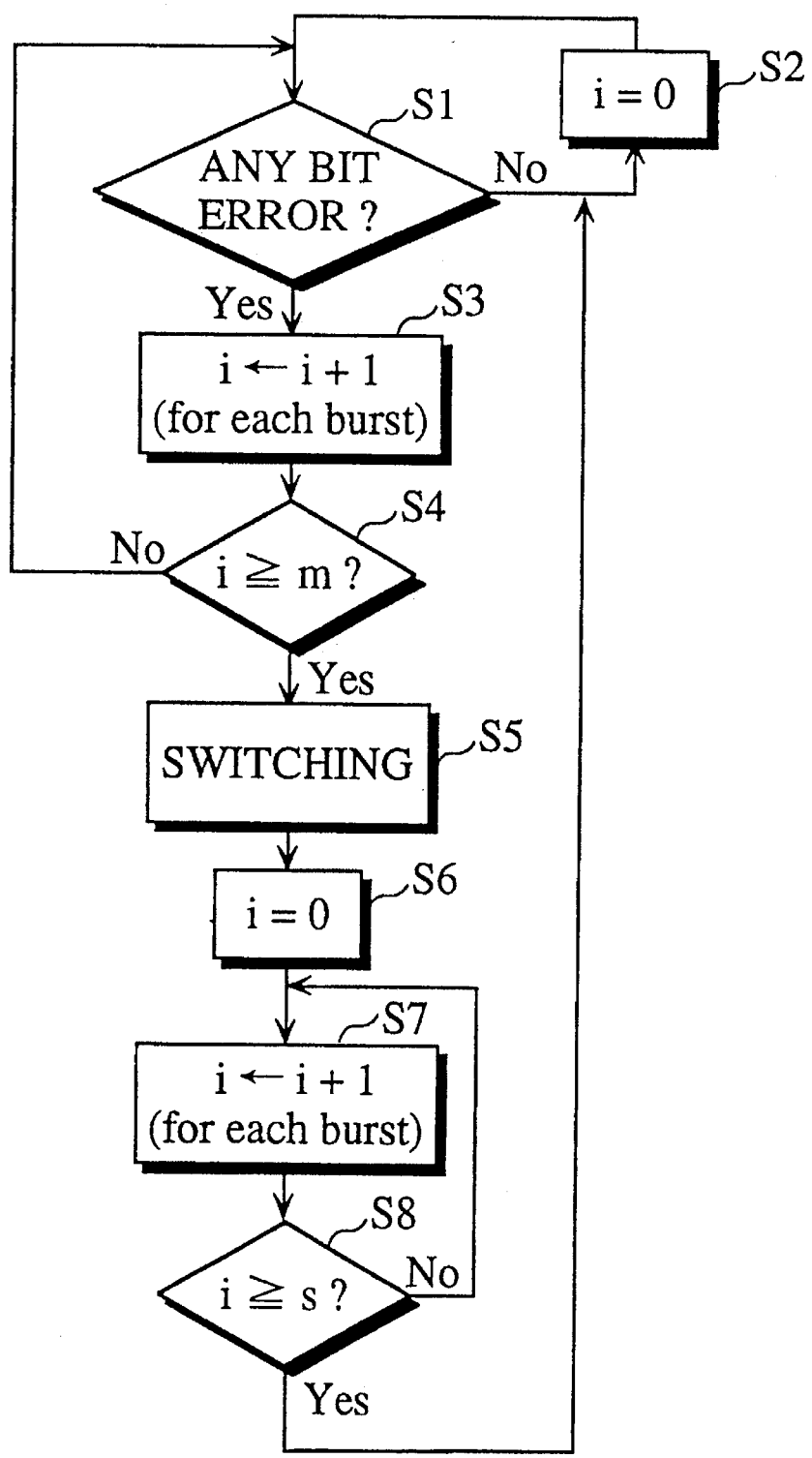
FIG. 9 is a flowchart detailing the antenna-switching operation.

FIG. 9 is a flowchart detailing the operation of the control circuit 56. The control circuit 56 receives the detection result from the bit-error detecting unit 55 (S1). In case of no bit error, the control circuit 56 sets a serial number for a burst i to 0 (S2). In case of a bit error, the control circuit 56 increments i each time it receives a burst (S3) and checks if i is equal or greater than m(i≧m) (S4). Steps 1–4 are repeated until i reaches m.

When i reaches m, the control circuit 56 controls the switching unit 53 to select the other currently non-selected antenna (S5). Then, the control circuit 56 resets i to 0 (S6) to increment i each time it receives a burst (S7), and checks if i is equal to or greater than s (i≧s) (S8). Steps 7, 8 are repeated until i reaches s. When i reaches s, the control circuit 56 returns to Step 2.

In the first embodiment, unlike the conventional receiver that uses the RSSI which is easily affected by external noise and interference signals, the control circuit 56 activates the switching unit 53 based on the bit error in the decoded burst. In addition, the system does not demand an expensive RSSI checking unit that requires a dynamic range and accuracy. As a result, a compact, inexpensive antenna switched diversity receiver which exhibits excellent performance is realized.

The control circuit 56 may be a logical circuit, or it may be a program using a micro processor. In case of the latter, the bit-error detecting unit 55 may operate based on that program either partially or entirely.

SECOND EMBODIMENT

Figure 10:
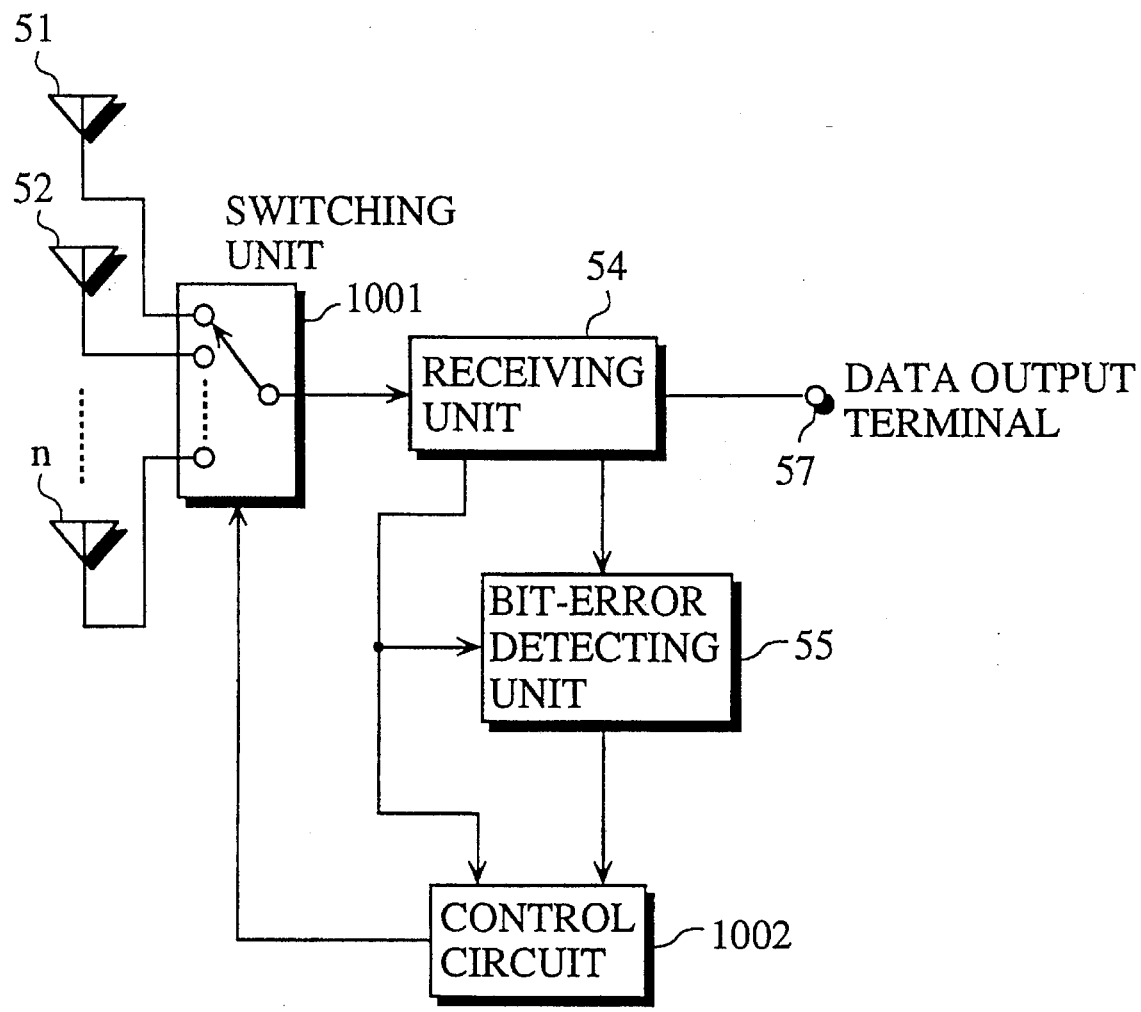
FIG. 10 is a block diagram depicting an antenna switched diversity receiver in accordance with the second embodiment of the present invention.

FIG. 10 is a block diagram depicting an antenna switched diversity receiver in accordance with the second embodiment of the present invention. Compared with the first embodiment, the receiver of the second embodiment receives a burst signal from more than two antennas. For this reason, the switching unit 53 is replaced with a switching unit 1001 and the control circuit 56 with a control circuit 1002. Hereinafter, like components are labeled with like reference numerals with respect to the first embodiment, and the description of these components is not repeated.

The control circuit 1002 operates in the same way as the control circuit 56 by circulating through Phases I to III, except that in Phase II, it controls the switching unit 1001 to select the antennas in a predetermined order.

According to the above construction, a probability increases in selecting the antenna that receives a burst having the best quality from a wider variety of antennas compared with the first embodiment. Thus, the diversity effect is further improved and hence the performance of the receiver is upgraded.

THIRD EMBODIMENT

Figure 11A:
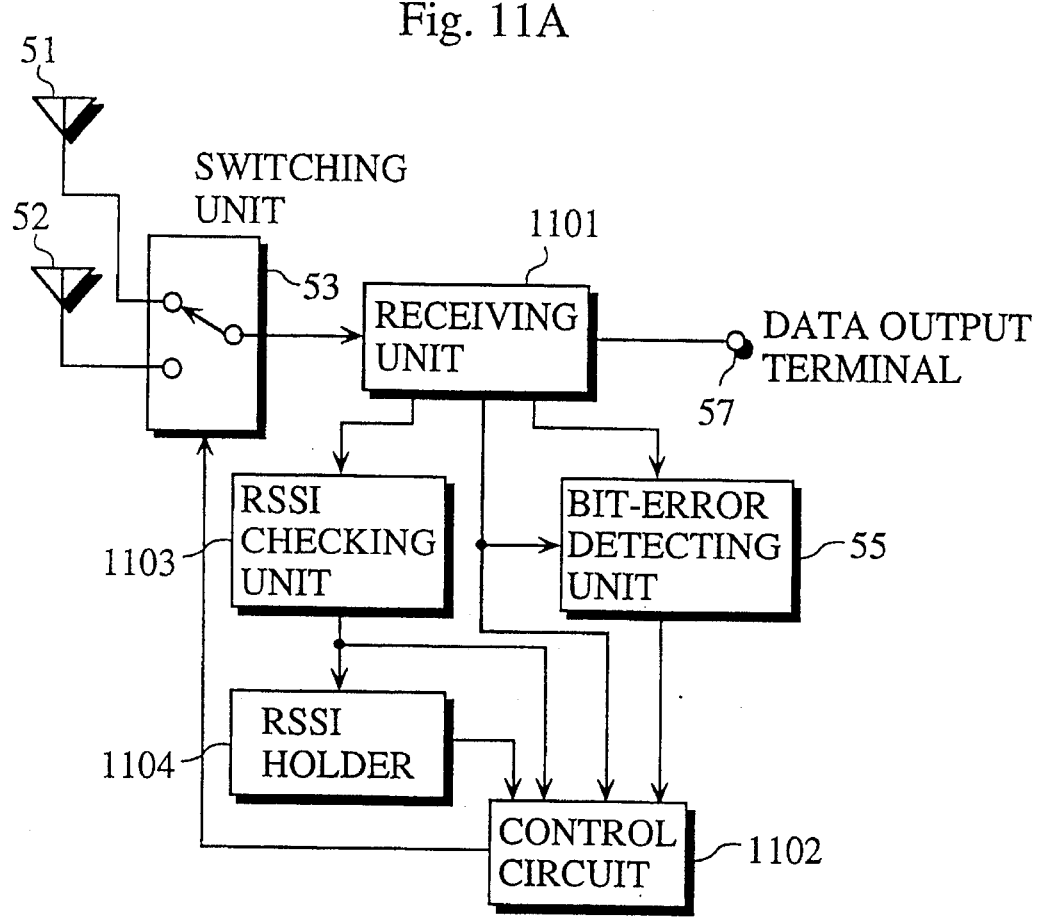
FIG. 11A is a block diagram depicting an antenna switched diversity receiver in accordance with the third embodiment of the present invention.

FIG. 11A is a block diagram depicting an antenna switched diversity receiver in accordance with the third embodiment of the present invention. Compared with the first embodiment, the receiver of the third embodiment selects an antenna based on the RSSI in addition to a bit error. For this reason, the receiving unit 54 is replaced with a receiving unit 1101 and the control circuit 56 with a control circuit 1102, and a RSSI checking unit 1103 and a RSSI holding unit 1104 are additionally included. Hereinafter, like components are labeled with like reference numerals with respect to the first embodiment, and the description of these components is not repeated.

The receiving unit 1101 is identical with the receiving unit 54 except that it is connected to both the bit-error detecting unit 55 and RSSI checking unit 1103.

The control circuit 1102 activates the switching unit 53 based on the RSSI in addition to the bit-error detector result.

Figure 11B:
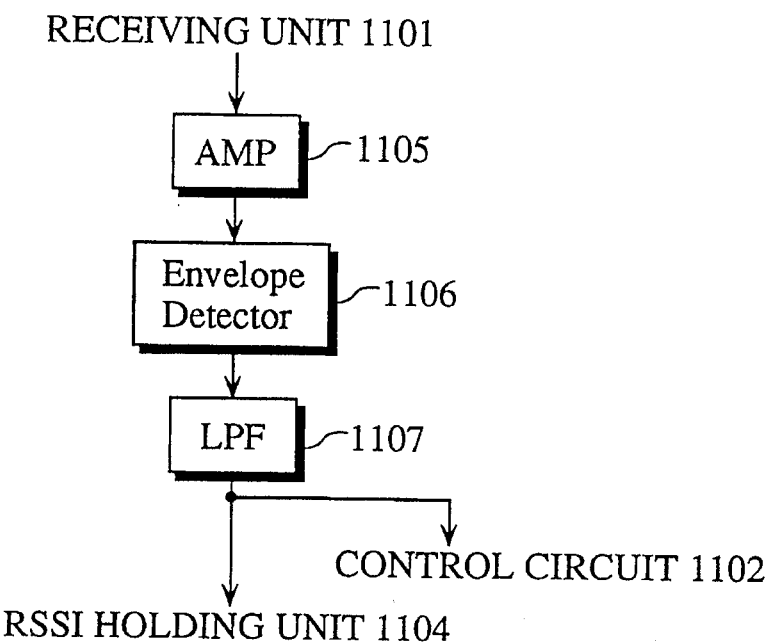
FIG. 11B is a block diagram depicting a RSSI checking unit.

The RSSI checking unit 1103 comprises, as shown in FIG. 11B, an amplifier 1105, an envelope detector 1106, and a low-pass filter 1107. The RSSI checking unit 1103, which is connected to the intermediate frequency amplifier 544 of the receiving unit 1101, checks a RSSI of a currently selected antenna, and the checking result is outputted to the RSSI holding unit 1104.

The RSSI holding unit 1104 holds RSSIs inputted from the RSSI checking unit 1103.

Figure 12:
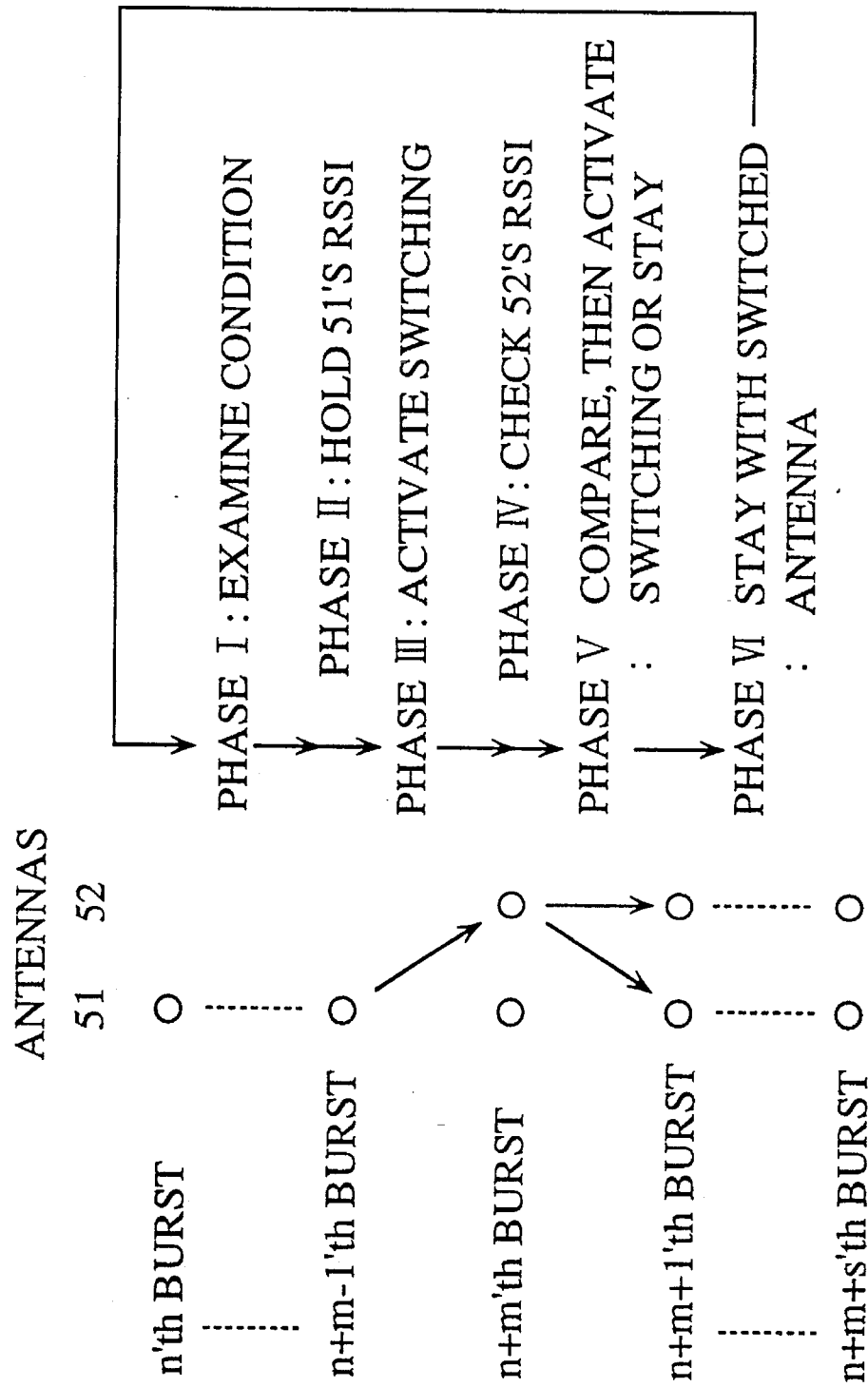
FIG. 12 is a view explaining an operation of the antenna switching diversity receiver in FIG. 11.

FIG. 12 is a view explaining the switching operation, which is composed of six phases. Note that the condition for switching activation is identical to the one in the first embodiment.

Phase I: the condition for switching activation is examined.

Phase II: the RSSI holding unit 1104 holds the RSSI of a currently selected antenna.

Phase III: prior to arrival of a following n+m'th burst, the control circuit 1102 controls the switching unit 53 to select the other antenna.

Phase IV: the control circuit 1102 compares the RSSI strength of the n+m'th burst with that of the preceding n+m−1'th burst held in the RSSI holding unit 1104 before the following n+m+1'th burst arrives.

Phase V: the control circuit 1102 controls the switching unit 53 to select the antenna having a greater RSSI.

Phase VI: a transient response time is allowed to inhibit the excess switching during s (s>1) consecutive bursts.

Phase VI may be omitted when the transient response is sufficiently fast.

By selecting the antenna receiving a burst having a greater RSSI in Phase V, the receiver operates in the same way as the antenna selection diversity receiver, thereby improving the diversity effect. Moreover, the hunting can be avoided by so doing. To be more specific, when simultaneous fade-out occurs and the condition for switching activation is fulfilled, a switching is carried out in one (herein the n+m'th burst) of (m+s+1)(≧3) bursts from the n'th burst to the n+m+s'th burst, but the unnecessary switching will not be performed when the burst having a better quality and a greater RSSI is detected after the switching.

Besides the improved diversity effect as excellent as that of an antenna selection diversity, the receiver of the third embodiment realizes a more compact, economical receiver compared with the antenna selection diversity.

Note that the RSSI holding unit 1104 may be a storage unit or a delaying unit when the burst arrives in a predetermined period. Also, the RSSI holding unit 1104 may be composed of two storage units, so that two values are stored in Phase IV and compared in Phase V.

The control circuit 1102 may be a logical circuit, or a a programmed micro processor. In case of the latter, the RSSI checking unit 1103, bit-error detecting unit 55, RSSI holding unit 1104 may operate on that program either partially or entirely.

Figure 13:
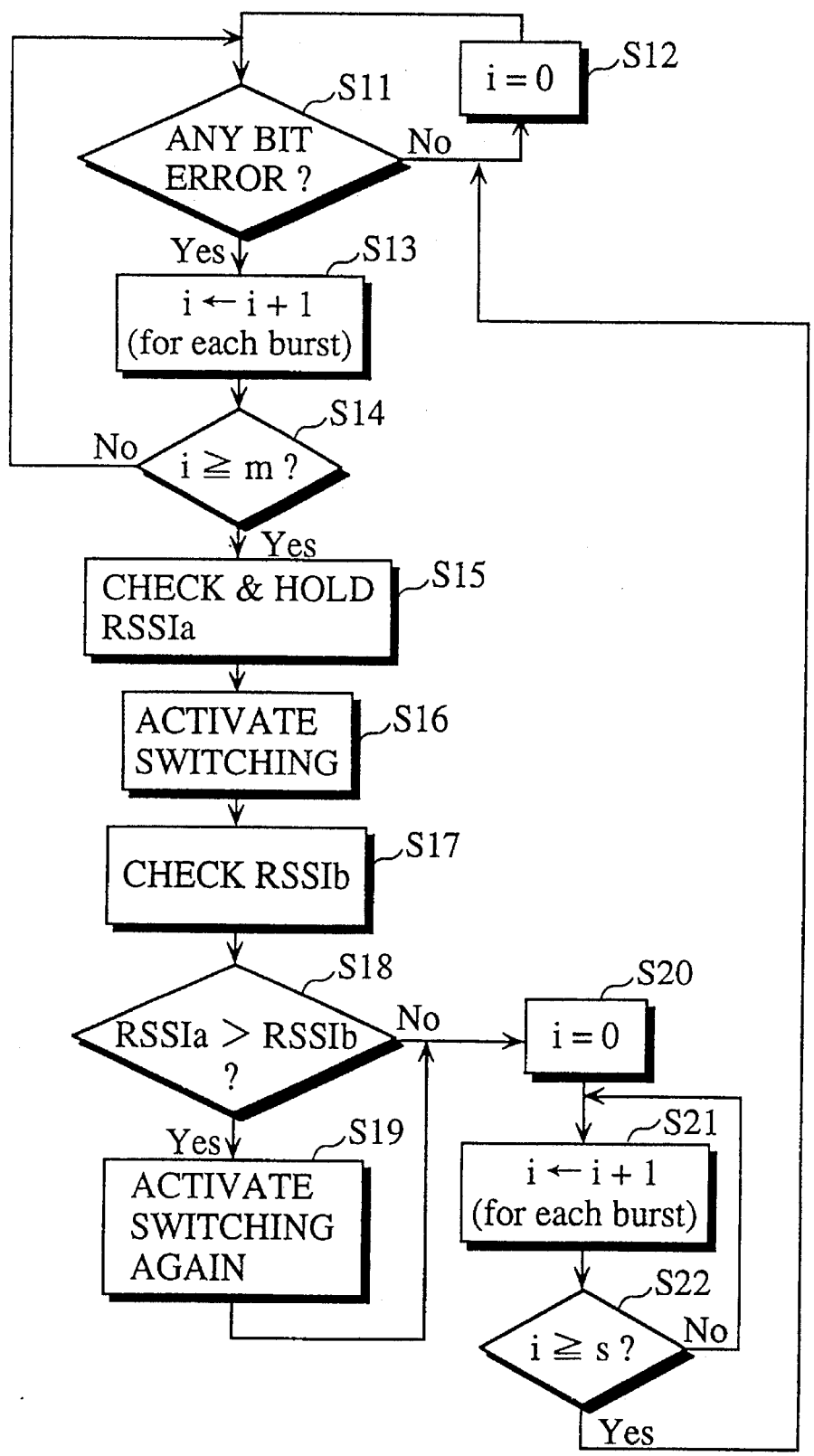
FIG. 13 is a flowchart detailing an antenna-switching operation by the antenna switched diversity receiver in FIG. 11A.

FIG. 13 is a flowchart detailing the switching control operation. The control circuit 1102 receives the bit-error detection result (S11). In case of no bit error, the control circuit 1102 sets i to 0 (S12), while incrementing i each time it receives a burst in case of a bit error(S13). Further, the control circuit 1102 checks whether i is equal or greater than m (i≧m) (S14). Steps 11 to 14 are repeated until i reaches m.

When i reaches m, the control circuit 1102 controls the RSSI holding unit 1104 to hold $RSSI_a$ of the n+m−1'th burst from i=0 (S15), and controls the switching unit 53 to select the other currently non-selected antenna (S16).

The control circuit 1102 subsequently receives $RSSI_b$ of the n+m'th burst from i=0 (S17), and compares $RSSI_a$ with $RSSI_b$ (S18). When $RSSI_a$ is greater than $RSSI_b$, the control circuit 1102 controls the switching unit 53 to select the other currently non-selected antenna (S19). Otherwise, the switching unit 53 stays with the currently selected antenna, and the control circuit 1102 resets i to 0 (S20) and increments i each time it receives a burst (S21), checking if i is equal or greater than s (S22). Steps 21, 22 are repeated until i reaches s, and when i reaches s, the control circuit 1102 returns to Step 12.

FOURTH EMBODIMENT

Figure 14:
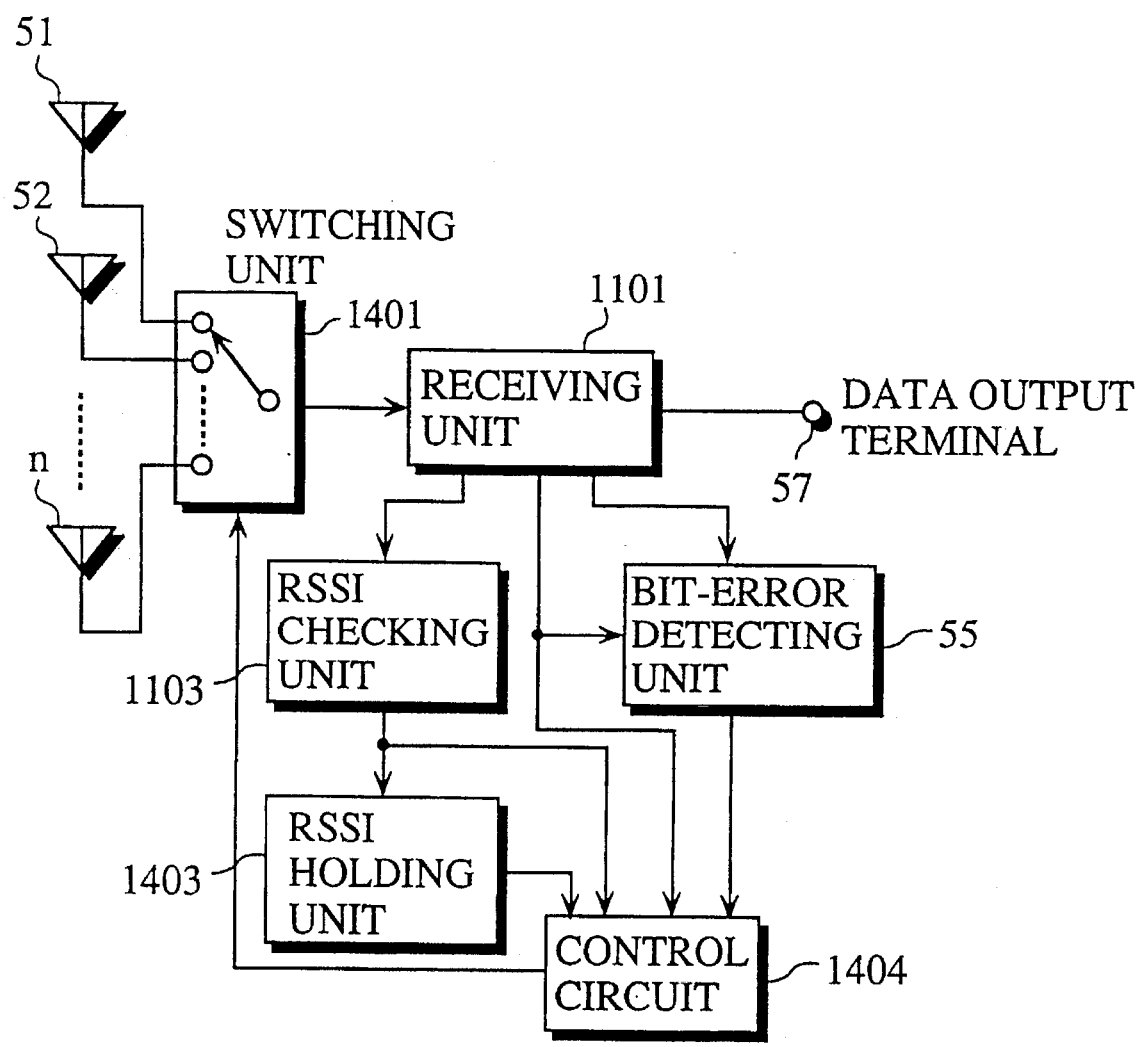
FIG. 14 is a block diagram depicting an antenna switched diversity receiver in accordance with the fourth embodiment of the present invention.

FIG. 14 is a block diagram depicting an antenna switching diversity receiver in accordance with the fourth embodiment of the present invention. Compared with the third embodiment, the receiver of the fourth embodiment receives a signal from more than two antennas. For this reason, the switching unit 53 is replaced with a switching unit 1401, and RSSI holding unit 1104 and a control circuit 1102 are replaced with a RSSI holding unit 1403 and a control circuit 1404, respectively. Hereinafter, like components are labeled with like reference numerals with respect to the third embodiment, and the description of these components is not repeated.

The switching unit 1401 selects one of three or more antennas, and the RSSI holding unit 1403 holds at least (the number of antennas minus one) RSSIs.

The control circuit 1404 operates in the same way as the control circuit 1102, except that it repeatedly activates the switching to all the antennas each time a burst arrives to check and hold all the RSSIs in the RSSI holding unit 1403 in Phase III, IV, and that it selects an antenna with the greatest RSSI in Phase V.

Like the first through third embodiments, the receiver of the fourth embodiment can further upgrade the diversity effect as well as realizing a compact, economical receiver. In particular, the diversity effect is significantly improved compared with the receiver of the third embodiment.

In any of the foregoing embodiments, the antenna is switched based on the bit-error detection result in each burst; the RSSI is also taken into account in the third and fourth embodiments. For this reason, the receiver of the present invention realizes diversity effect as excellent as the selection diversity regardless of the interference and noise signals, while being compact and economical.

Although the present invention has been fully described by way of example with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An antenna switched diversity receiver which receives bursts in a digital radio system, the receiver comprising:

a plurality of physically separated antennas;

switching means for selectively switching to one of said plurality of antennas to receive a burst in a time series;

decoding means for decoding transmission data contained in said received burst in an inverse manner to coding of said transmission data to produce decoded data;

bit-error-detecting means for detecting a bit error in decoded data in each received burst; and control means for activating said switching means to switch to a next one of said plurality of antennas when said bit-error-detecting means detects at least one bit error in each of m consecutive bursts, m being an integer greater than one.

2. The receiver of claim 1, wherein said control means includes antenna-designating means for designating an antenna to be switched to in a predetermined order.

3. The receiver of claim 1, wherein said bit-error-detecting means includes:

reference data detecting means for detecting reference data in decoded data, said reference data being attached to each burst prior to transmission; and comparing means for comparing said detected reference data with comparison data and for producing a comparison result, said comparison data being a replica of said reference data and held in said comparing means, said bit-error-detecting means further being operative to detect a bit error based on said comparison result.

4. The receiver of claim 1, wherein said bit-error-detecting means includes:

redundant code detecting means for detecting a redundant code in decoded data to thereby generate a detected redundant code, said redundant code being attached to each burst prior to transmission; and computing means for carrying out a computation using said detected redundant code in a predetermined way to produce a computing result, said bit-error-detecting means further being operative to detect a bit error based on said computing result.

5. The receiver of claim 1, wherein said control means, after switching, controls said switching means according to one of a first control mode and a second control mode, said switching means being allowed to successively switch to another antenna in said first control mode and being disallowed to switch to another antenna for a certain period in said second control mode.

6. The receiver of claim 5, wherein, in said second control mode, said control means determines said certain period based on the transient response of said receiver.

7. An antenna switched diversity receiver which receives bursts in a digital radio system, the receiver comprising:

a plurality of physically separated antennas;

switching means for selectively switching to one of said plurality of antennas to receive a burst in a time series;

decoding means for decoding transmission data contained in a received burst in an inverse manner to coding of said transmission data to produce decoded data;

bit-error-detecting means for detecting a bit error in decoded data in each received burst;

RSSI checking means for checking an RSSI of a switched-to antenna;

RSSI holding means for holding an RSSI; and control means for controlling said switching means in accordance with both the result of said detecting and said checking, said control means activating said switching means to switch to a next one of said plurality of antennas when said bit-error-detecting means detects at least one bit error in each of m consecutive bursts, m being an integer greater than one.

8. The receiver of claim 7, wherein said control means controls said switching means to switch to said next one of said plurality of antennas and subsequently controls said switching means in one of two ways, said ways respectively comprising staying with said next one of said plurality of antennas and switching to another antenna based on the result of said checking.

9. The receiver of claim 7, wherein said control means includes antenna-designating means for designating an antenna to be switched to in a predetermined order.

10. The receiver of claim 7, wherein said bit-error-detecting means includes:

reference data detecting means for detecting reference data in decoded data, said reference data being attached to each burst prior to transmission; and comparing means for comparing said detected reference data and comparison data and for producing a comparison result, said comparison data being a replica of said reference data and held in said comparing means, said bit-error-detecting means further being operative to detect a bit error based on said comparison result.

11. The receiver of claim 7, wherein said bit-error-detecting means includes:

redundant code detecting means for detecting a redundant code in decoded data to thereby generate a detected redundant code, said redundant code being attached to each burst prior to transmission; and computing means for carrying out a computation using said detected redundant code in a predetermined way to produce a computing result, said bit-error-detecting means further being operative to detect a bit error based on said computing result.

12. The receiver of claim 7, wherein said control means controls said switching means not to switch to another antenna for a certain number of bursts after switching based both on the result of said detecting and on the result of said checking.

13. The receiver of claim 7, wherein said RSSI checking means includes:

checking means for checking an RSSI per burst; and a first output means for outputting an RSSI to said RSSI holding means, and wherein said RSSI holding means includes:

means for delaying an RSSI for one burst to produce a delayed RSSI and for holding said delayed RSSI and means for holding a current RSSI; and a second output means for outputting a delayed RSSI and a current RSSI to said control means.

14. The receiver of claim 13, wherein said control means controls said switching means to switch to each one of said plurality of antennas in a predetermined order, and said RSSI holding means holds all RSSIs of said plurality of antennas, said control means further being operative to cause said switching means to switch to an antenna that has the greatest RSSI.

15. The receiver of claim 13, wherein said control means includes

RSSI comparing means for comparing a current RSSI held in said RSSI holding means with a delayed RSSI held in said delayed RSSI holding means, said control means further being operative to cause said switching means to switch back to a previously-selected antenna when said current RSSI is smaller than said delayed RSSI.

16. An antenna switched diversity receiver which receives bursts in a digital radio system, the receiver comprising:

a plurality of physically separated antennas;

switching means for selectively switching to one of said plurality of antennas to receive a burst in a time series;

decoding means for decoding transmission data contained in a received burst in an inverse manner to coding of said transmission data to produce decoded data;

bit-error-detecting means for detecting a bit error in the decoded data in each received burst;

RSSI checking means for checking an RSSI of a switched-from and a switched-to antenna;

RSSI holding means for holding an RSSI; and control means for controlling said switching means to switch from a first of said plurality of antennas to a selected second of said plurality of antennas in response to the result of said detecting, said first of said plurality of antennas thereby comprising the switched-from antenna, said selected second of said plurality of antennas thereby comprising the switched-to antenna, and for causing said switching means to thereafter switch back to said switched-from antenna based on the relative RSSI of the respective switched-to and switched-from antennas, wherein said RSSI checking means includes:

checking means for checking an RSSI per burst; and a first output means for outputting an RSSI to said RSSI holding means, and wherein said RSSI holding means includes:

means for delaying an RSSI for one burst to produce a delayed RSSI and for holding said delayed RSSI and means for holding a current RSSI; and a second output means for outputting a delayed RSSI and a current RSSI to said control means.

17. The receiver of claim 16, wherein said bit-error-detecting means includes:

redundant code detecting means for detecting a redundant code in decoded data to thereby generate a detected redundant code, said redundant code being attached to each burst prior to transmission; and computing means for carrying out a computation using said detected redundant code in a predetermined way to produce a computing result, said bit-error-detecting means further being operative to detect a bit error based on said computing result.

18. The receiver of claim 16, wherein said control means includes antenna-designating means for designating an antenna to be switched to in a predetermined order.

19. The receiver of claim 16, wherein said bit-error-detecting means includes:

reference data detecting means for detecting reference data in decoded data, said reference data being attached to each burst prior to transmission; and comparing means for comparing said detected reference data and comparison data and for producing a comparison result, said comparison data being a replica of said reference data and held in said comparing means, said bit-error-detecting means further being operative to detect a bit error based on said comparison result.

20. The receiver of claim 16, wherein said control means controls said switching means not to switch to another antenna for a certain number of bursts after switching based both on the result of said detecting and on the result of said checking.

21. The receiver of claim 16, wherein said control means controls said switching means to switch to each one of said plurality of antennas in a predetermined order, and said RSSI holding means holds all RSSIs of said plurality of antennas, said control means further being operative to cause said switching means to switch to an antenna that has the greatest RSSI.

22. An antenna switched diversity receiver which receives bursts in a digital radio system, the receiver comprising:

a plurality of physically separated antennas;

switching means for selectively switching to one of said plurality of antennas to receive a burst in a time series;

decoding means for decoding transmission data contained in a received burst in an inverse manner to coding of said transmission data to produce decoded data;

bit-error-detecting means for detecting a bit error in the decoded data in each received burst;

RSSI checking means for checking an RSSI of a switched-from and a switched-to antenna;

RSSI holding means for holding an RSSI; and control means for controlling said switching means to switch from a first of said plurality of antennas to a selected second of said plurality of antennas in response to the result of said detecting, said first antenna thereby comprising the switched-from antenna, said selected second of said plurality of antennas thereby comprising the switched-to antenna, and for causing said switching means to thereafter switch back to said switched-from antenna based on the relative RSSI of the respective switched-to and switched-from antennas, wherein said RSSI checking means includes:
checking means for checking an RSSI per burst; and
a first output means for outputting an RSSI to said RSSI holding means, wherein said RSSI holding means includes:
means for delaying an RSSI for one burst to produce a delayed RSSI and for holding said delayed RSSI and means for holding a current RSSI; and
a second output means for outputting a delayed RSSI and a current RSSI to said control means, and wherein said control means includes RSSI comparing means for comparing a current RSSI held in said RSSI holding means with a delayed RSSI held in said delayed RSSI holding means, said control means further being operative to cause said switching means to switch back to a previously-selected antenna when said current RSSI is smaller than said delayed RSSI.

* * * * *